March 19, 1957　　　　E. T. KERNICK　　　　2,785,528
GLOBE CLOCK
Filed July 1, 1954　　　　　　　　　　　　2 Sheets-Sheet 1

INVENTOR.
Emily T. Kernick
BY Peter Fries, Jr.
ATTORNEY

March 19, 1957   E. T. KERNICK   2,785,528
GLOBE CLOCK
Filed July 1, 1954   2 Sheets-Sheet 2
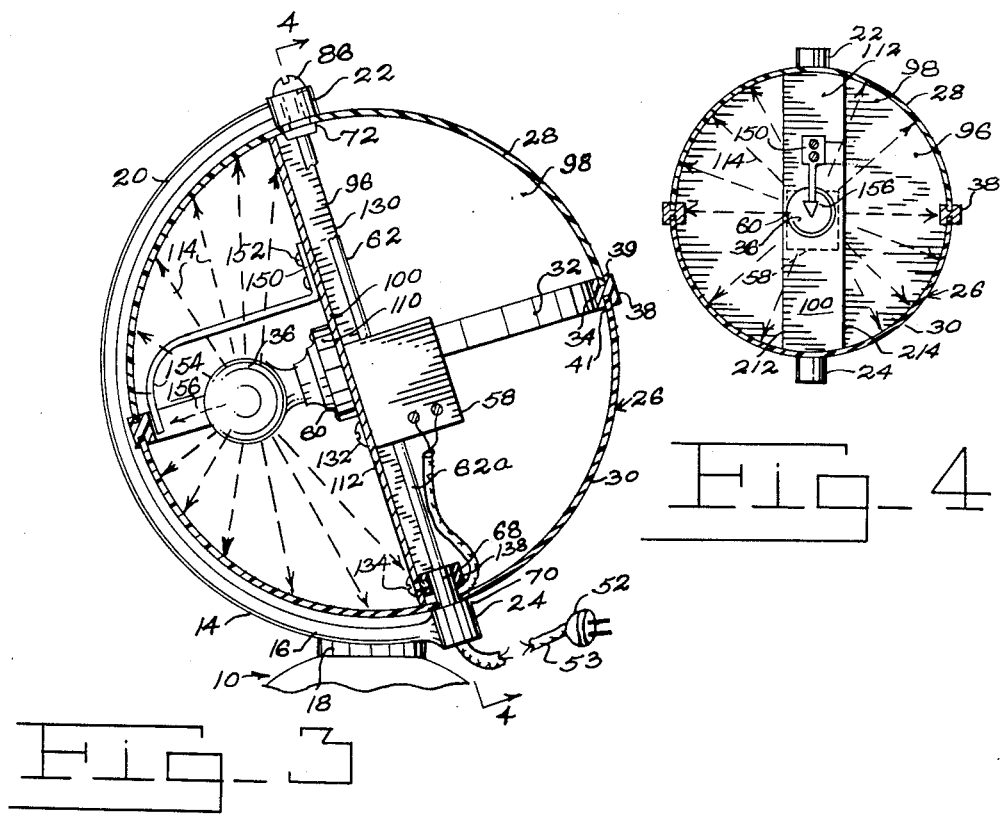
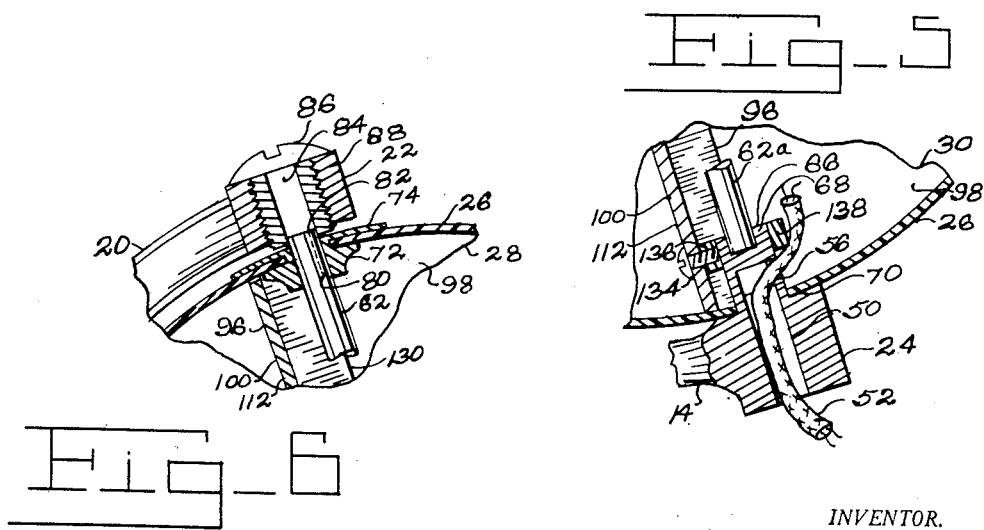
INVENTOR.
Emily T. Kernick
BY
Peter Fries, Jr.
ATTORNEY

United States Patent Office 2,785,528
Patented Mar. 19, 1957

2,785,528

GLOBE CLOCK

Emily T. Kernick, Danbury, Conn.

Application July 1, 1954, Serial No. 440,663

2 Claims. (Cl. 58—44)

This invention relates to improvements in globe clocks and the like.

An object of the invention is to provide a novel and improved horological device in which there is a spherical globe, with means cooperating therewith to exhibit the time of day.

Another object of the invention is to provide a novel and improved horological device in which there is a major spherical element in the form of a globe, bearing thereon a representation of the various land areas of the earth, in their true geographical relationships, the globe being constructed for rotation about its axis, in strict conformance with the timing of the rotation of the earth, so that the position of the globe relative to a stationary light source indicates the time at that moment at all locations on the globe, or on any location as desired.

A further object of the invention is to provide a novel and improved horological device which has the outward general appearance of a geographical spherical globe with the various land and sea areas delineated thereon in their true geometric relationships, and wherein there is a self contained source of illumination within the translucent globe, so that its light is visible from outside the globe, and with a self contained baffle partition wall which is so arranged with respect to the globe and source of illumination, that the globe is never illuminated on more than one-half of its external area, that is to say, the baffle partition wall lies substantially in a plane parallel to the vertical axis of the globe, so-called.

Still another object of the invention is to provide a novel and improved globe clock in which there is a base or pedestal, with an arcuate globe support bracket carried by the pedestal, and forming a pair of axially aligned globe support bearings in outer ends of the globe support bracket, a spherical globe being journaled in said bearings for rotation about an axis substantially the same as the axis of the earth, with drive means for rotating the spherical globe, the drive means being disposed inside the globe, and wherein there is means for casting directed illumination from a light source within the translucent globe, so as to illuminate only one half of the globe surface, corresponding to the approximate globe area illuminated by the sun, the globe's rotation serving to continuously progressively change the area under illumination in synchronism with the change of time on the earth, and with fixed time indicating means visible thereon.

Still a further object of the invention is to provide an improved and novel horological device and time globe, by means of which the time at any particular location on the earth may be observed immediately, without need for calculation, and by mere inspection of the globe, and the illuminated area thereof in relation to the equatorial time band element.

Another object of the invention is to provide a novel and improved globe which rotates about an axis simulating the axis of the earth, while within the translucent globe there is a stationary light source with a light baffle partition wall also stationary in relation thereto, and so arranged as to block incidence of light from the light source upon more than one-half of the global area, the plane of light cut-off being arranged so as to be parallel to the axis of the globe, and to thus divide the globe into continuously varying hemispheres on said axis, in synchronism with the earth's rotation, and hence truly in synchronism with the time.

A further object of the invention is to provide a novel and improved globe clock of the character described, which is simple in design, inexpensive to manufacture, highly accurate in operation, and which instantly indicates time as desired in relation to the earth's surface.

These and other objects and advantages of the invention will become apparent from the following description of a preferred embodiment thereof, as illustrated in the accompanying drawings, forming a part hereof, and in which, Figure 1 is a front elevational view showing a globe clock according to the invention.

Figure 3 is a sectional elevational view of the globe shown in Figure 1, and taken from the same viewing aspect, but with the internal works turned ninety degrees in a clockwise direction from the position shown in Figure 2, for clarity of illustration.

Figure 4 is a sectional elevational view taken substantially on plane 4—4 of Figure 3, and on a smaller scale.

Figure 5 is a fragmentary sectional view taken of the lower portion of the parts shown in Figure 3, and further sectioned to illustrate the construction, the view being fragmentary and on a larger scale.

Figure 6 is a fragmentary sectional view taken of the upper portion of the parts shown in Figure 3, and further sectioned to illustrate the construction, the view being on a larger scale.

Figure 7:
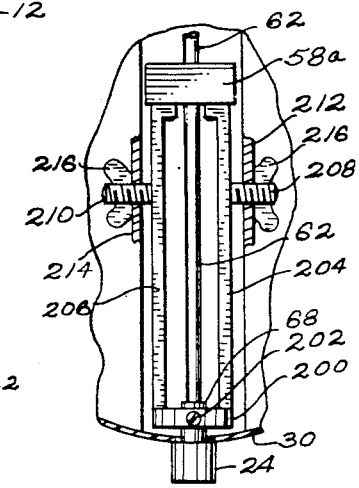

Figure 7 is an elevational fragmentary view showing a modified form of the invention providing for tilting of the baffle plate or wall for seasonal indication, the view being taken from behind Figure 4, but modified accordingly, showing the baffle wall pivot at the axis, the motor elevated from the position shown in Figure 3 to allow clearance, and being supported on the upright legs 204 and 206, the view being further broken out for illustrative purposes.

In all views it is understood that sufficient clearance will be allowed in proportioning the parts, to allow for any desired movement thereof, as needed.

In connection with the use of a spherical geographical globe showing the land and sea areas of the earth, it is useful to relate the motion of the earth to the time, and the present invention provides a horological device in the nature of a globe clock for this purpose. It includes a hollow spherical envelope formed of translucent material, such as glass, plastic, or the like, which is mounted for rotation about an axis corresponding to the axis of the earth, in a relatively stationary arcuate support bracket mounted on a fixed base. Novel constructional means are provided for rotating the globe from within, the whole having the general outward appearance of a conventional type of globe until the power is applied. When this is done, the self-contained source of illumination inside the globe is actuated, and there is baffle wall means arranged so that the light can only illuminate a half of the global surface. As the motive power operates, the globe itself rotates about its axis, while the light source and the baffle wall means remains stationary.

In this manner it is apparent that one-half of the globe is dark, while the other half is light, and hence the central area of the lighted area corresponds to noon, and is thus constantly changing. With an annular equatorial time belt indicator, and one or more stationary pointer devices, the time on the earth is seen by inspection, in relation to any location desired, and at any time.

Such a device is useful for general time information, for sequential time indication relating to various locations on the earth's surface, and further as a navigational instrument, among other advantages. In order to understand clearly the nature of the invention, and the best means for carrying it out, reference may now be had to the drawings, in which like numerals denote similar parts throughout the several views.

As shown, there is a relatively stable base member 10, which may be rounded so as to be circular in plane aspect, or otherwise shaped as desired, so as to rest upon any suitable supporting surface 12. The base member 10 may be smoothly upwardly convergent or reduced as illustrated, and may be weighted internally for enhanced stability if needed. An arcuate bracket globe support 14 is secured at 16 to the upward extension 18 of the main base 10, by any suitable means, such as screws, integral casting or formation, or otherwise, and has an elongated arcuate leg 20 extending upwardly therefrom as shown best in Figures 1 and 3, with bearing hubs 22 and 24 formed at opposite ends thereof.

A spherical globe member 26 is supported as described hereinbelow for rotation about the axes of said bearing hubs 22 and 24. The spherical globe member 26 may be divided into complementary hemispheres 28 and 30 which thus meet at the equator 32 of the globe, and may be interfitted or otherwise interconnected in any suitable manner, as by providing an inner flange 34, carried by the lower hemisphere 30, and providing a seat for mating the lower edge of the upper hemisphere 28 therewith when assembled, so as to turn together. A snug fit will normally suffice at this junction, for suitably engaging the upper and lower hemispheres to turn together, although other securing means may be employed for enhancing the junction.

The spherical globe member 26 is preferably made of translucent material, such as glass, plastic, or the like, so that its surface may be illuminated from an internal light source such as lamp 36 or the like. A time belt or band 38 which is annular and extends through 360 degrees about the equatorial region of the globe, is disposed as shown, and may be supported thereat in any suitable manner. One preferred mode of support of such time belt 38, is by forming a pair of annular upwardly and downwardly open grooves or seats 39 and 41 in the upper and lower edges respectively of the time belt 38, so that the lower edge of the upper hemisphere can fit snugly but not tightly in the upper groove 39, and the upper edge of the lower hemisphere can fit snugly but not tightly in the lower groove 41, as seen best in Figure 3. The fit is such that the time belt 38 and the upper and lower hemispheres will move together as a unit when left alone, but permitting the time belt to be turned relative to the upper and lower hemispheres to adjust the position angularly in relation thereto, while holding the hemispheres stationary. The time belt thus moves with the rotation of the sphere.

The lower globe support hub 24 has an axial bore 50 formed therethrough, to receive the electric light power cord wire 52, the outer end of which is provided with a plug 54 for insertion in any convenient electric light power outlet to energize the device. A suitable switch may be interposed in the cord 52 for turning the device on or off as desired. The bore 50 is bent at any angle as shown in 56 in Figure 5, to allow the cord 52 to extend therefrom, for connection to the electric drive motor 58, and to the electric light socket 60 for powering the same.

The electric motor 58 may be one of the clock motors of any suitable synchronous type for alternating current, or may be direct current, and has an upwardly extending drive shaft 62, which, through suitable gear trains rotates at a speed of one revolution in twenty-four hours, the lower end 62a of the drive shaft extending downwardly as shown, and being journaled in a bearing socket 66 formed in the upward cylindrical extension 68 of the bearing hub 24 for rotation in the bearing socket 66. From Figure 5, it is apparent that the bearing hub extension 68 is reduced in diameter where it extends through the opening 70 of the lower hemisphere 30, so that the hemisphere 30 is free to rotate about its axis as shown.

At the upper end of the hemisphere 28, as shown in detail in Figures 3 and 6, the drive shaft 62 extends through an opening formed in the grommet or bushing 72, which is turned over and integral with the top flange or washer 74 so as to firmly grasp the upper hemisphere 26 for rotation therewith. The drive shaft 62 may be either pressed firmly into the axial opening in the grommet 62 for rotation therewith, or may be keyed as at 80 thereto in any suitable manner. The upper end 82 of the drive shaft 62 is journaled in the axial bore 84 of the hollow bearing screw 86, which is externally threaded into the axial bore 88 of the upper globe support hub 22. It is apparent that the screw 86 may be upwardly retracted to disengage from the upper end of the drive shaft 62 when it is desired to remove the drive shaft 62, which is then clear to be moved to the right as seen in Figure 6, allowing the upper hemisphere 26 to be removed, and allowing access to the interior of the globe.

Figure 1:
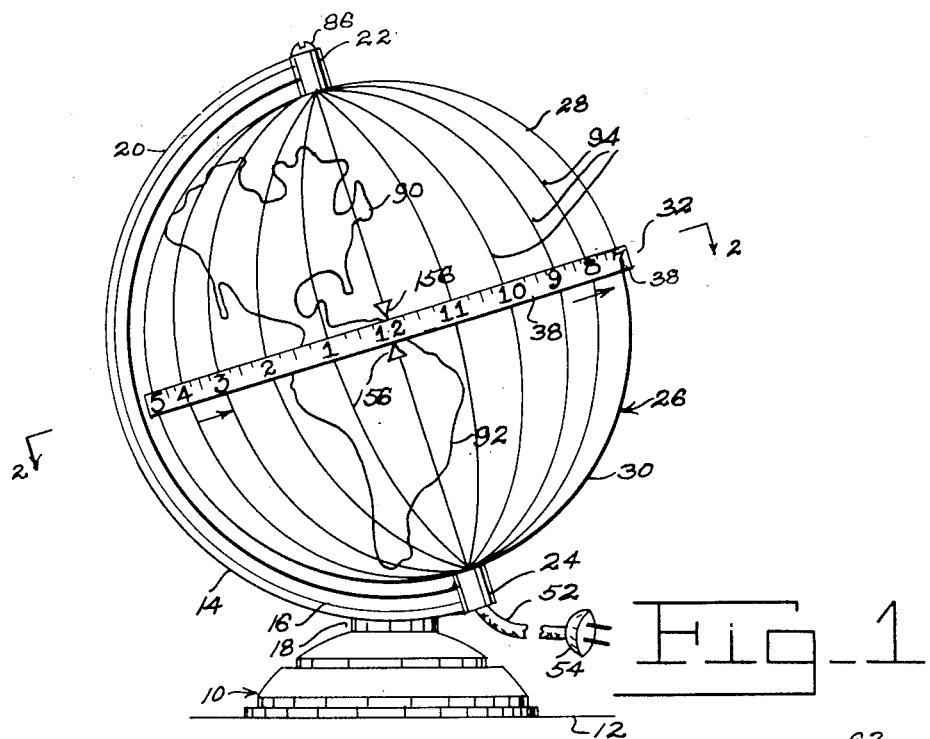

From Figure 1 it is seen that the outer surface or the inner surface of the spherical globe 26 may be imprinted or otherwise marked to exhibit the various land and sea areas of the earth, such as North and South America as at 90 and 92, for example, and other areas. The global area is also further sub-divided by longitude, by arcuate delineations 94. The time belt 38 is similarly subdivided into 24 subdivisions mainly to indicate the 24 hours of the day, but in two successive series each from zero to 12, indicating night and day. To afford visibility to the underlying areas, the time belt may be made of suitable transparent material, such as glass or plastic material, if desired.

I also provide a baffle wall or partition 96, which is intended to divide the interior chamber 98 of the globe in half, so that 180 degrees of the global chamber 98 are on one face of the baffle wall 96, and the remaining 180 degrees are on the other face of the baffle wall. The baffle wall 96, as seen clearly in Figure 4, is generally in the form of a disc, conforming to the inside diameter of the global chamber 98, but just a little less in diameter, so that the edges of the baffle wall 96 do not rub against the interior surface of the global chamber 98 as the globe rotates around the baffle wall. In order to avoid interference with the motor drive shafts 62 and 62a, it is preferable to bend the central portion of the baffle disc 96, as at 100, out of the plane of the balance of the disc 96, so as to form a central plateau or offset 96 or hollow area.

Figure 2:
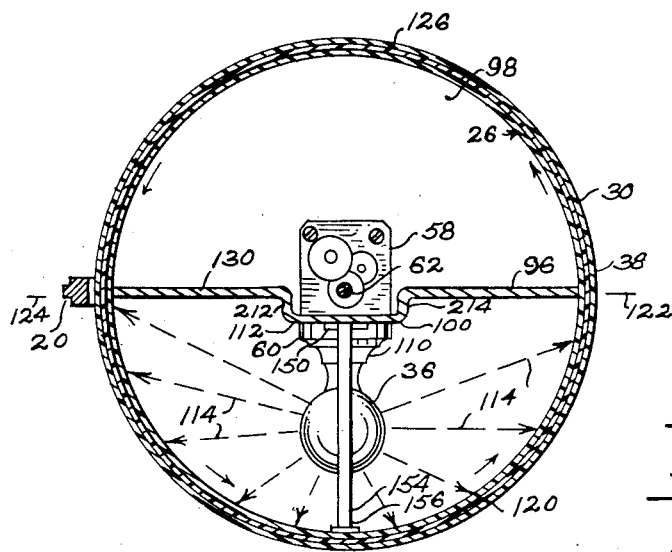
Figure 2 is a sectional planar view taken substantially on plane 2—2 of Figure 1, and indicating light rays in broken linear lines.

An electric light socket 110 is mounted on the face 112 of the baffle wall 96, and an electric light lamp 36 is threaded into the socket for casting illumination as shown by the ray lines 114. Since the baffle wall 96 is opaque, it is apparent that the light rays 114 can only illuminate 180 degrees of the surface area of the globe at a time, so that, as seen in Figure 4, all one face of the globe is illuminated, while the other face is dark, the light face being shown in Figure 2 at 120 between locations 122 and 124, while the dark face is shown at 126, between the same locations, that is, on the other side of the baffle wall 96. Hence, as the globe turns about its axis, the illuminated areas of the earth are continuously changing, in synchronism with the rotation of the earth, and hence with the actual time. The clockwork motor 58 is also supported by the baffle wall 96, but on the other or dark face 130 thereof, by any suitable means such as screws 132. The baffle wall 96 in turn is secured in place in any suitable manner, as by means of the screw or screws 134, which extends through a radial bore 136 in the collar 138 which is secured to the lower hub extension 68 so as to be fixed. By loosening the screw 134, it is seen that the entire inner assembly such as the baffle wall 96, the motor 58, the lamp 36, and other parts carried thereby, may be turned about the axis of the shaft 62a, such as has been done in Figure 3, to face the lamp 36 in any desired direction.

A bracket 150 is secured by screws 152 to the face 112 of the baffle wall 96, and extends outwardly and downwards as at 154 to the equatorial belt of the globe, and may carry one or more indicating pointers 156, which are seen through the globe 26, when the lamp 36 is lighted. Since the pointers cast a shadow at the global equatorial area on the perpendiculars, which indicates noon time as the globe turns, this is the center of the illuminated area of the globe. The globe clock is set in any suitable manner, one example of which is by moving the numbered time belt or band 38 in line with, for example, New York city longitude, so that the 12 noon figure is directly on this longitude, and then the complete globe and band are turned to line up the stationary pointer and hour on the time band for the existing correct time at New York city. Then the plug is attached to the electric outlet, starting the motor. Now, one half of the globe is light and the other half is dark, and successively other areas of the globe light up and others become dark, while the stationary pointers 156 register the time, which will always be the existing time in New York, the light band will show where noon is occurring. It is noted that the pointers can be located either inside or outside the globe, and when mounted outside the globe may be secured to any stationary portion of the mounting, such as the upper hub 22. If desired, the time band can be provided with an additional set of numerals which will be smaller and of a different color preferably than the numbers shown, being therebelow. These numbers will be offset so that the upper large numbers indicate the time at the desired location, such as New York city, while the smaller numbers indicate the corresponding time at all other time zones displaced therefrom.

Figure 7 shows how the device may be modified for tilting the baffle plate 96 and the parts carried thereby, so as to show the seasonal tilting of the earth in the light pattern shown. In this view, instead of securing the baffle plate 96 at the bottom as shown in Figure 3, this screw 134 is omitted, and instead a yoke collar 200 is secured by screw 202 to hub 68, the yoke collar having upstanding posts or standards 204 and 206 with trunnion bearing shafts 208 and 210 extending outwardly therefrom at the central portion of the baffle plate 96, the clockwork motor being moved upwardly to position 58a to allow clearance. The shafts 208 and 210 extend through openings in the walls 212 and 214 of the baffle plate 96, or extensions thereof, being secured pivotally therein by means of wing nuts 216. By loosening the wing nuts, it is simple to adjust the relative tilt of the baffle plate 96 to suit the seasons of the year, and thus vary the light pattern incidence.

Although I have described my invention in specific terms, it will be understood that various changes may be made in size, shape, materials and arrangement without departing from the spirit and scope of the invention as claimed.

I claim:

1. A globe clock comprising a pair of complementary upper and lower hemispheres formed with translucent walls, time band means in the form of an annulus of translucent material with annular groove means for engaging said upper and lower hemispheres so as to move together, but to be relatively adjustable relative to both hemispheres when they are held stationary and the annular time band is turned about its axis, means for supporting said combined upper and lower hemispheres and time band means for rotation about the axis thereof, motor means carried inside said globe for rotating the said globe about its axis so as to undergo one revolution per twenty-four hours, lamp means carried stationarily inside said globe for casting illumination therethrough, and baffle means carried stationarily inside said globe and constructed and arranged for blocking incidence of illumination from said lamp means on more than half of said global surface, the light and dark areas of which continuously change as the globe rotates, and time indicating pointer means pointing to said time band to exhibit the time at any period relative to any global location.

2. A globe clock comprising a pair of upper and lower complementary hemispheres formed of translucent material, an annular time belt disposed intermediate the edges of said hemispheres, and comprising annular grooves to receive and engage with said edges of said hemispheres for movement together, said time belt being adjustable about said hemispheric equator when said hemispheres are held stationary, said time belt being translucent and bearing time numerals in serial sequence, said hemispheres having shown thereon the global land and sea areas of the earth, bearing means engaging said globe for supporting the same in position for rotation about its axis, motor means inside said globe for rotating the globe at a speed of substantially one revolution in twenty-four hours, relatively stationary lamp means inside said globe for casting illumination toward the surface of said globe, baffle wall means carried stationarily inside said globe for blocking incidence of light rays from said lamp means upon more than substantially one-half of said global area, so that as the globe rotates, one-half constantly changing, remains light while the other half remains dark, constantly changing, whereby, the globe is illuminated and darkened corresponding to the solar earth illumination, and time pointer means carried stationarily so as to point at said time band numerals, or subdivisions, said time band and time pointer means being capable of being brought into suitable juxtaposition so that at any moment, the time pointer means points at the time at any desired location, on the time band.

References Cited in the file of this patent

UNITED STATES PATENTS

| | | |
|---|---|---|
| 1,515,135 | Alexander | Nov. 11, 1924 |
| 1,959,601 | Schulse | May 22, 1934 |
| 2,040,322 | Mandai | May 12, 1936 |
| 2,068,418 | Kyack | Jan. 19, 1937 |
| 2,314,269 | Dupler | May 16, 1943 |

FOREIGN PATENTS

| | | |
|---|---|---|
| 873,158 | Germany | Apr. 16, 1953 |